United States Patent [19]

Striek et al.

[11] Patent Number: 5,144,543
[45] Date of Patent: Sep. 1, 1992

[54] DOMESTIC APPLIANCE HAVING ELECTRICALLY ISOLATED INPUT CONTROL CIRCUITRY

[75] Inventors: Ralf-Jürgen Striek; Peter Müller, both of Berlin, Fed. Rep. of Germany

[73] Assignees: The Coca-Cola Company, Atlanta, Ga.; Bosch-Siemens Hausgeräte GmbH, Münich, Fed. Rep. of Germany

[21] Appl. No.: 631,959

[22] Filed: Dec. 21, 1990

[30] Foreign Application Priority Data

Dec. 21, 1989 [DE] Fed. Rep. of Germany ....... 3942430

[51] Int. Cl.⁵ ............................................ H02M 3/335
[52] U.S. Cl. ...................................... 363/16; 363/50; 323/902
[58] Field of Search ............... 323/902, 904, 905, 909; 363/50, 125, 126, 15–16

[56] References Cited

U.S. PATENT DOCUMENTS

| | | | |
|---|---|---|---|
| 4,384,259 | 5/1983 | Capewell | 323/902 |
| 4,584,519 | 4/1986 | Grvodis | 323/905 |
| 4,933,825 | 6/1990 | Allington et al. | 323/902 |

Primary Examiner—Peter S. Wong
Attorney, Agent, or Firm—Birch, Stewart, Kolasch & Birch

[57] ABSTRACT

In a domestic appliance such as a washer, dishwasher, dryer, beverage preparation device or the like having several control circuits driven by varying voltage supplies, the input control circuit is supplied with a relatively low voltage and is electrically isolated from higher voltages within the circuitry of the appliance. An optical isolator is provided in the communication channel between the input control circuit and a power control circuit which is connected to circuit elements connected to the A.C. line voltage. The low voltage supply driving the input control circuit is also isolated from the A.C. line voltage. All operator accessible components are coupled to the input control circuit and are therefore isolated from the A.C. line voltage.

15 Claims, 2 Drawing Sheets

DOMESTIC APPLIANCE HAVING ELECTRICALLY ISOLATED INPUT CONTROL CIRCUITRY

FIELD OF THE INVENTION

The present invention is directed to a domestic appliance having input control circuitry which is electrically isolated from a relatively high voltage supply. More particularly, the present application is directed to a domestic appliance such as a washer, dishwasher, dryer, beverage preparation device or the like having several control circuits driven by varying voltage supplies where the input control circuit is supplied with a relatively low voltage and is electrically isolated from higher voltages within the circuitry of the appliance.

BACKGROUND OF THE INVENTION

In domestic electrical appliances or the like such as washers, dishwashers, dryers, and beverage preparation devices, it is important to ensure a high degree of safety of the users of such a device from the possibility of electrical shock due to exposure of the operator or user to a relatively high voltage such as the A.C. line voltage. To ensure the safety of such domestic appliances, safety standards have evolved which must be complied with in order to market such an appliance. For example, one safety standard requires at least 8 millimeter (mm) of air gap and at least 2 mm of insulation gap between portions of the apparatus exposed to line voltage and those parts to be in contact with the operator or user. In addition to electric motors and other line voltage driven controlled elements of such an appliance, the sensors and control components as well as the display devices must meet such a high safety standard when they are electrically connected to the high voltage components of the appliance. Control switches must also comply with the above mentioned standards as there is a probable risk of contact during user operation of the appliance.

Heretofore, it has been conventional practice to drive the input circuit with low voltage in addition to the appliance sensors, the sensors normally being the most readily "touchable" or accessible electrical components of the appliance. However, it is desirable to supply such a domestic appliance with line voltage power supply such as the conventional 110 V. A.C. line power. If such a high voltage power supply is to be used to power the appliance, the low voltage circuitry must be separated from the line driven circuitry according to prescribed safety standards. Accordingly, it is desirable to electrically isolate the user accessible electrical components of domestic appliance from the AC line voltage so as to isolate the operator or user from a possibility of electric shock.

OBJECTS OF THE INVENTION

It is an object of the present invention to construct a domestic appliance in which the risk of shock to the user or operator is substantially reduced;

it is a further object of the present invention to construct a domestic appliance equipped with a line voltage A.C. power supply as well as user accessible electrical components such as a key pad, display, sensors and the like while substantially limiting the possibility of electrical shock to the user.

SUMMARY OF THE INVENTION

According to the teachings of the present invention, the individual circuits, for example the low-voltage input control circuitry and power-supply circuitry, are electrically isolated from one another to substantially reduce the risk of electric shock to the user or operator. For example, in a preferred embodiment, the apparatus contains at least one input control circuit driven by a low voltage direct current supply, and a power supply circuit also driven by low voltage direct current supply. In this preferred embodiment, the power control circuitry controls power switching devices or the like which are connected directly to the A.C. line voltage. Accordingly, according to the teachings of the present invention, the low voltage input control circuit is electrically isolated from the power control circuit by at least one electrically isolated signal connection facilitating control communication therebetween. Further, at least the power supply for the input control circuit is electrically isolated from the main power supply of the appliance. In this way, the low-voltage input control circuitry is electrically isolated from all other portions of the appliance circuitry which are connected to high voltage.

The power control circuit of the above mentioned embodiment is utilized to drive power components such as motors, valves, heaters, blowers, coolers and the like. The signal connection between the input control circuit and the power control circuit is advantageously achieved through photo-optical or photo-electric isolation devices which are well suited for control signal transmission. Should photo-electric isolation devices be employed, a photo-optical or photo-electric converter would be located between the input control circuit and the power control circuit.

In a preferred embodiment of the present invention, a single photo-electric isolator is located in a single signal transmission path. While plural signals may be necessary to control the power control circuit and its associated power components, the plural signals may be converted using a parallel-series converter into a serial combined signal for transmission on this single communication link. Similarly, the power control circuit is provided with a series-parallel converter to convert the information transmitted serially into parallel control signals for processing by the power control circuit to control the various power components. Alternatively, the teachings of the present invention may be utilized to transmit control pulses in parallel through the use of several isolated communication conductors between the input control circuit and power control circuit.

Input power amplifiers are connected in series with the operating components addressed by the power control circuit in the embodiment of the present invention. Analog-digital converters may be interposed between various sensors and the input control signal. Additionally, the input control circuit is provided with a programming key pad as well as display devices.

In an alternative embodiment, a transformer may be used in place of a photo-electric isolator to electrically isolate the low voltage input control circuit from the power control circuit. Any such transformer may be used which will satisfy the above mentioned conditions. The use of such transformers is in some respects disadvantageous in that the pulses provided by the input control circuit to the power control circuit are substantially rounded due to the inductive effect of the transformer. However, transformers may be used in place of photo-electric isolation devices in any suitable application.

As previously explained, the domestic appliance of the present invention obtains its power supply from the A.C. line voltage. In the above mentioned embodiment which employs an input control circuit and separate power control circuit, it is desirable to employ a safety transformer to isolate the power supply to the input control circuit from the power supply to the remainder of the domestic appliance. For example, a transformer constructed according to standard VDE 0551 might be employed in cooperation with the AC-rectifier-converter allowing the input control circuit to be driven at, for example, 4 to 6 volts while the power control circuit is driven with 20 or 24 volts. The low DC voltage supplied the input control circuit can be also utilized to drive the sensors and other components attached thereto, such as analog-digital converters and sensors utilized in a domestic appliance.

BRIEF DESCRIPTION OF THE DRAWINGS

The present invention may be better understood with reference to the appended drawings in which.

DETAILED DESCRIPTION OF THE PREFERRED EMBODIMENT

Figure 1:
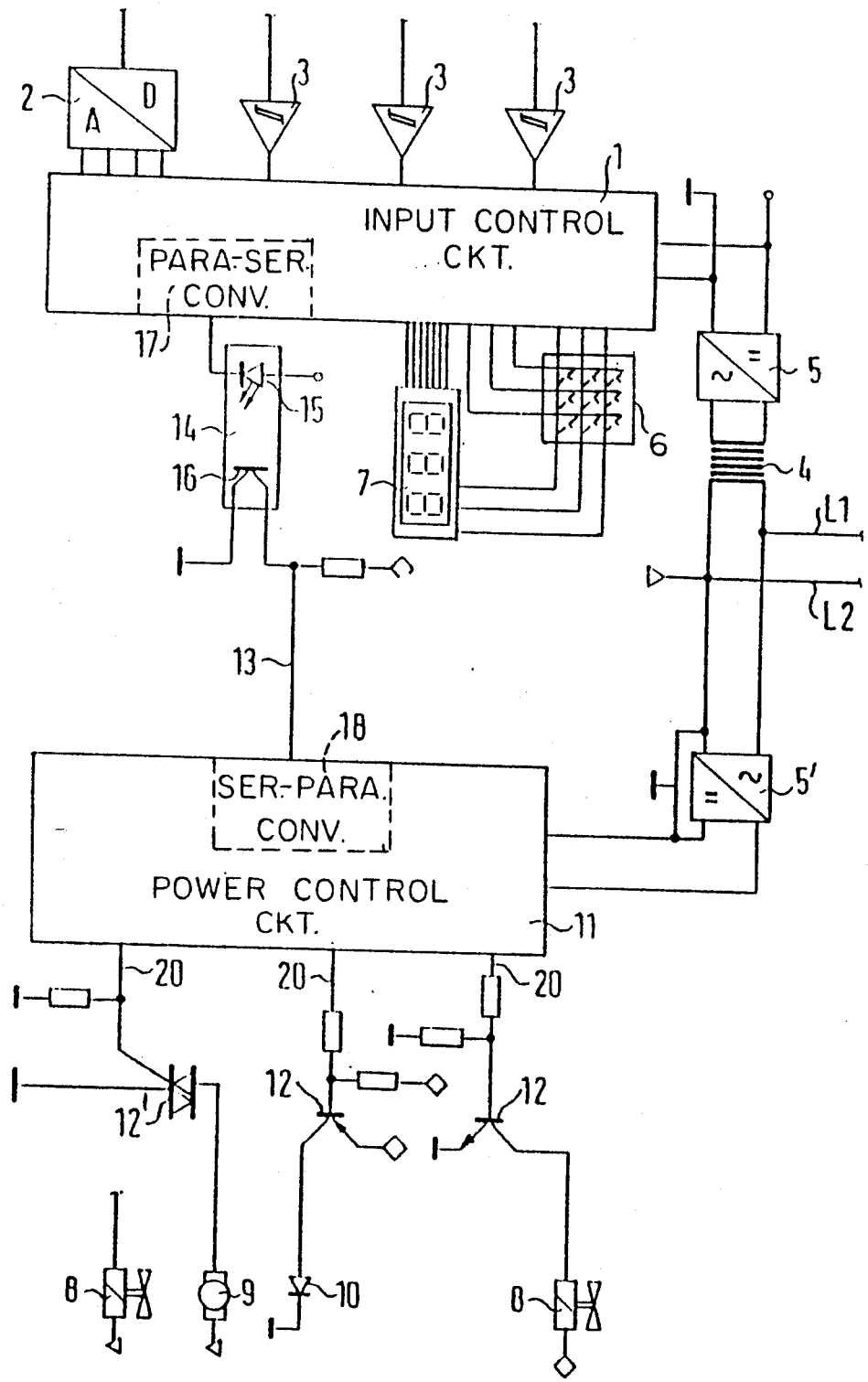
FIG. 1 illustrates one embodiment of the circuitry of the present invention utilizing optical isolation in the control signal transmission path.

The invention described in the present application may be better understood with reference to the following detailed description and appended drawings. The circuitry as illustrated in FIG. 1 contains various modules and/or component groups which individually are conventional and may be selected as would occur to one of ordinary skill in the art.

An input control circuit 1 receives signals from a plurality of sensors 3 which measure, for example, liquid status, component or liquid temperature, or the status of some other parameter of the apparatus or the material contained therein. One or more of such sensors 3 may supply a sensed information signal to the input control circuit 1 through the use of an analog/digital converter 2 which digitizes the sensed information signal. While the analog/digital converter 2 of FIG. 1 is illustrated as a separate element from the input control circuit 1, the analog/digital converter may be optionally integrated into the input control circuit 1 as a part thereof.

A line voltage input is applied to the domestic appliance from an AC voltage supply line at input voltage points L1 and L2. A safety transformer 4 constructed in accordance with the standards of VDE 0551, for example, receives the line voltage applied to voltage points L1 and L2 and may optionally lower the line voltage to a desired operating voltage. The output of the safety transformer 4 is connected to an AC-DC converter 5. The transformer 4 and the AC-DC converter 5 supply the input control circuit 1 with a direct current of, for example, 4-6 volts.

As shown in FIG. 1, a key entry pad 6 and display 7 are additionally connected to the input control circuit 1 to facilitate the adjustment and identification of desired operational processes. Safety transformer 4 ensures that no main supply voltage can be transferred to the control circuit 1, the display 7, or the keypad 6. Thus, the line voltage is isolated from the input control circuit 1 and its associated user or operator accessible keypad 6 and display 7, ensuring the high degree of safety necessary to protect such users without the otherwise necessary air or insulation gap. The sensors 3 associated with the input control circuit 1 are also isolated from the line voltage since these sensors may be touchable by the user or operator and thus must comply with the same high safety standards.

The domestic appliance of the present invention employs a number of controlled outputs such as the switching valves 8, motor 9 and any other necessary component such as 10. These components must be supplied with a relatively high voltage output and thus are provided with their own power control circuit 11 for supplying this relatively higher drive voltage. In the embodiment of FIG. 1, the power control circuit 11 is a relatively low-voltage driver which provides switching signals to a plurality of amplifying components such as transistors 12 or triac 12, which may switch the AC line voltage or other high voltage to the power components 8-10. Alternatively, the power control circuit could be driven by the line voltage, if desired.

In the present preferred embodiment, the power control circuit 11 is driven by a relatively low-voltage drive of, for example, 24 volt D.C. Accordingly, an AC-DC converter 5' is provided to lower the line voltage and convert it to DC. The AC-DC converter 5' may include a voltage divider and/or transformer. The power control circuit 11 controls the gating of the circuit components 12, 12' by supplying gating or switching signals thereto on conductors 20.

The power control circuit 11 according to the teachings of the present invention is not safety isolated from the line voltage. Since the input control circuit 1 should be completely isolated from the line voltage, signal transmission from the input control circuit 1 to the power control circuit 11 is conducted via a signal conductor 13 having safety isolation provided therein. Outgoing signals provided by the input control circuit 1 are transmitted through a photo-electric converter 14 which, for example, includes a photo-transistor or light emitting diode 15 and a photo-electric sensor 16. The modulation of the light emitting diode 15 is sensed by the photo-electric sensor 16 which passes the modulated signal on to signal conductor 13. Thus, transmission of control signals is facilitated without any direct electrical connection between the input control circuit 1 and power control circuit 11.

The embodiment of FIG. 1 illustrates only a single communication channel including a single conductor 13 between the input control circuit 1 and power control circuit 11. However, is should be understood that plural communication channels employing plural photo-electric converters 14 and conductors 13 may also be utilized to communicate between the input control circuit 1 and power control circuit 11. As shown in FIG. 1, a parallel-serial converter 17 is provided in the input control circuit 1 and a serial-parallel converter 18 is provided in the power control circuit 11 to facilitate the multiplexing of the control signals onto the single communication channel.

Although the preferred embodiment of the present invention employs a photo-electric converter 14 to isolate the input control circuit 1 from the power control circuit 11, it is also possible to employ a safety transformer (not shown) instead of the photo-electric converter 14 to isolate the input control circuit 1 for the power control circuit 11. However, such a safety transformer causes a filtering or rounding of the communication pulses and thus is less desirable than the photo-electric converter 14 of the preferred embodiment. According to the teachings of the present invention, however, it is important to provide electrical isolation between the input control circuit 1 and power control circuit 11.

As previously stated, the use of a parallel-serial converter 17 in the input control circuit 1 and a serial-parallel converter 18 in the power control circuit 11 enables the use of a single transmission channel to transmit almost any quantity of data. These conversion processes can be realized, for example, by means of a "micro-controller" as is known in the art. The control of the communication channel can be distributed either to the input control circuit 1 or the power control circuit 11 or to both circuits. In constructing a device according to the teachings of the present invention, consideration must be made as to whether parallel transmission or the use of a parallel-serial and serial-parallel converter should be utilized.

Figure 2:
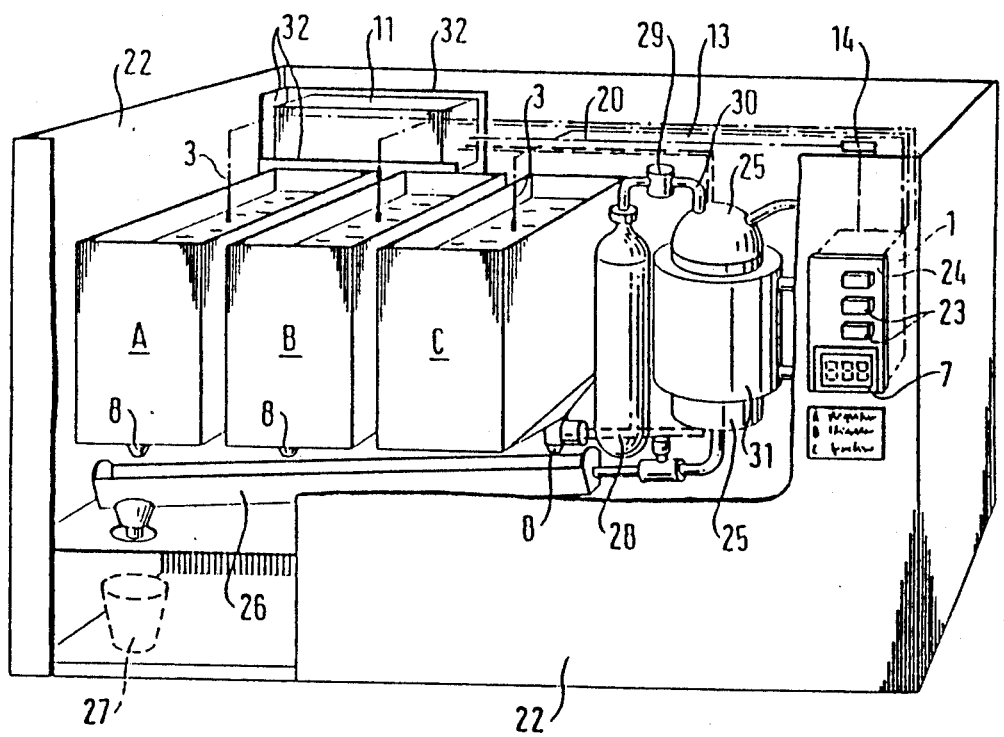
FIG. 2 illustrates a sectional schematic view of a beverage dispensing appliance employing the control circuitry constructed according to the teachings of the present invention.

According to the teachings of the present invention, the circuitry described in FIG. 1 is utilized in a beverage preparing and dispensing apparatus for dispensing lemonade, soft drinks or the like as illustrated in FIG. 2. In this figure, a box type housing 22 is illustrated with the front thereof partially cut away to better illustrate the contents thereof. The beverage dispensing appliance includes beverage containers A, B and C for containing beverage concentrate for three different beverages. All containers A–C are provided without flow valves 8 of the type illustrated in FIG. 1. These out flow valves 8 are electromagnetically operated through signals provided by conductors 20. Sensors 3 are provided for measuring the fill level of each of the beverage containers A–C. The conductors associated with each of these sensors 3 are connected to the input control circuit 1.

Individual beverages may be selected by the customer for dispensing through actuation of manual controls 23 provided on the control panel 24. The manual controls 23 correspond to the individual switches of the keypad 6 of FIG. 1. A display 7 is provided on the front panel of the device housing 22 for displaying the beverage selected. The beverage dispensing apparatus of FIG. 2 additionally contains a water dispenser 25 which dispenses a given quantity of water into a blending and supply duct 26 for mixing with the beverage concentrate received from containers A–C. This mixture is accomplished within the blending and supply duct 26 for supply to the customer into a cup or other receptacle 27. A sensor 3 (not shown) is also mounted in the water dispenser 25 to determine the water level within the dispenser. This sensor is likewise connected to the input control circuit 1.

A pressurized gas container 28 is provided for receiving, for example, $CO_2$ gas for carbonating selected beverages. The pressurized gas container 28 is connected to water dispenser 25 via a gas line 30 provided with a pressure-reducing valve 29. The water to be supplied to the blending and supply duct 26 may therefore be carbonated by $CO_2$. The water dispenser 25 is surrounded by a cooling shield 31 in which a cooling coil (not shown) is provided. The cooling coil is connected to a coiling motor as part of a refrigeration system in a manner well known in the art. A sensor 3 is provided within the water dispenser 25 to measure the temperature of the water to be dispensed into the blending and supply duct. Should water temperature exceed a predetermined value, further cooling is enabled.

The input control circuit 1 is connected via the signal conductor 13 to the power control circuit 11. The power control circuit 11 is separated from the housing 22 by an appropriate dielectric insulator 32. The dielectric insulator 32 shields the housing from the supply line voltage and also protects the power control circuit from adverse environmental factors such as waters and acids. The valves 8 and cooling motor are connected to the power control circuit by the conductors 20.

The beverage vending machine explained above with respect to FIG. 2 illustrates the applicability of the circuitry of FIG. 1 for providing good electrical isolation of the touchable, primarily metallic parts of the machine. In an apparatus where gases, acids, and water are necessary for beverage preparation, possible electrical leakage of the line voltage to the metallic parts of the machine must be avoided.

From the foregoing description, it is apparent that the isolation techniques utilized in accordance with the teachings of the present invention provide advantages in such a device. These advantages derive from the concepts set forth in the present application which may exhibit a variety of forms. Modification of the teachings of the present application may be made as would occur to one of ordinary skill in the art. The specification of the present application therefore does not limit the scope of the present invention which should be determined solely by the scope of the appended claims.

We claim:

1. A domestic appliance comprising:
   one or more controlled devices driven by a high voltage supply;
   a power control circuit supplying control signals to said controlled devices;
   a low voltage input control circuit electrically isolated from said high voltage supply and including a touch panel for inputting operator commands, said input control circuit developing control commands for supply to said power control circuit;
   an electrically isolated serial communication path between said low voltage input control circuit and said power control circuit for communicating said control commands therebetween, said power control circuit generating control signals operating said controlled devices in response to receipt of said control commands;
   a parallel to serial signal converter coupled between said low voltage input control circuit and said serial communication path; and
   a serial to parallel signal converter coupled between said serial communication path and said power control circuit.

2. The appliance of claim 1 further comprising:
   a low voltage power supply for supplying low voltage power to said low voltage input control circuit,
   a control voltage power supply for supplying power to said power control circuit;
   said low voltage power supply being electrically isolated from said control voltage power supply.

3. The appliance of claim 2 wherein said low voltage power supply and said control voltage power supply each include an AC-DC converter.

4. The appliance of claim 2 wherein said low voltage power supply includes a safety separation transformer.

5. The appliance of claim 1 wherein said electrically isolated communication path includes an photo-optical or photo-electric isolator.

6. The appliance of claim 1 wherein said electrically isolated communication path is the only control communication path between said low voltage input control circuit and said power control circuit, said electrically isolated communication path having a single communication channel.

7. The appliance of claim 6 wherein said power control circuit controls plural functions of said appliance.

8. The appliance of claim 1 wherein said parallel to serial signal converter is included in said low voltage input control circuit; and
wherein said serial to parallel signal converter is included in said power control circuit.

9. The appliance of claim 1 wherein said controlled devices are isolated from said low voltage input control circuit.

10. The appliance of claim 9 wherein said controlled devices switch power to one or more drive components of said appliance to provide control thereof.

11. The appliance of claim 9 wherein said controlled devices are one or more drive components of said appliance.

12. The appliance of claim 9 further comprising at least one input sensor coupled to said low voltage input control circuit for sensing a condition of the appliance and supplying sensor signals to said low voltage input control circuit.

13. The appliance of claim 12 wherein said at least one input sensor is also electrically isolated from said power control circuit and said controlled devices.

14. The appliance of claim 1 further comprising a display and an input keyboard coupled to said low voltage input control circuit.

15. The appliance of claim 14 wherein said display and input keyboard are electrically isolated from said power control circuit and said controlled devices.

* * * * *